Jan. 27, 1970  J. B. FARR  3,492,635
SPATIAL FILTERING SYSTEM WHEREIN DIFFERENT PORTIONS
OF AN INPUT OBJECT ARE DIFFERENTLY FILTERED
Filed June 22, 1966
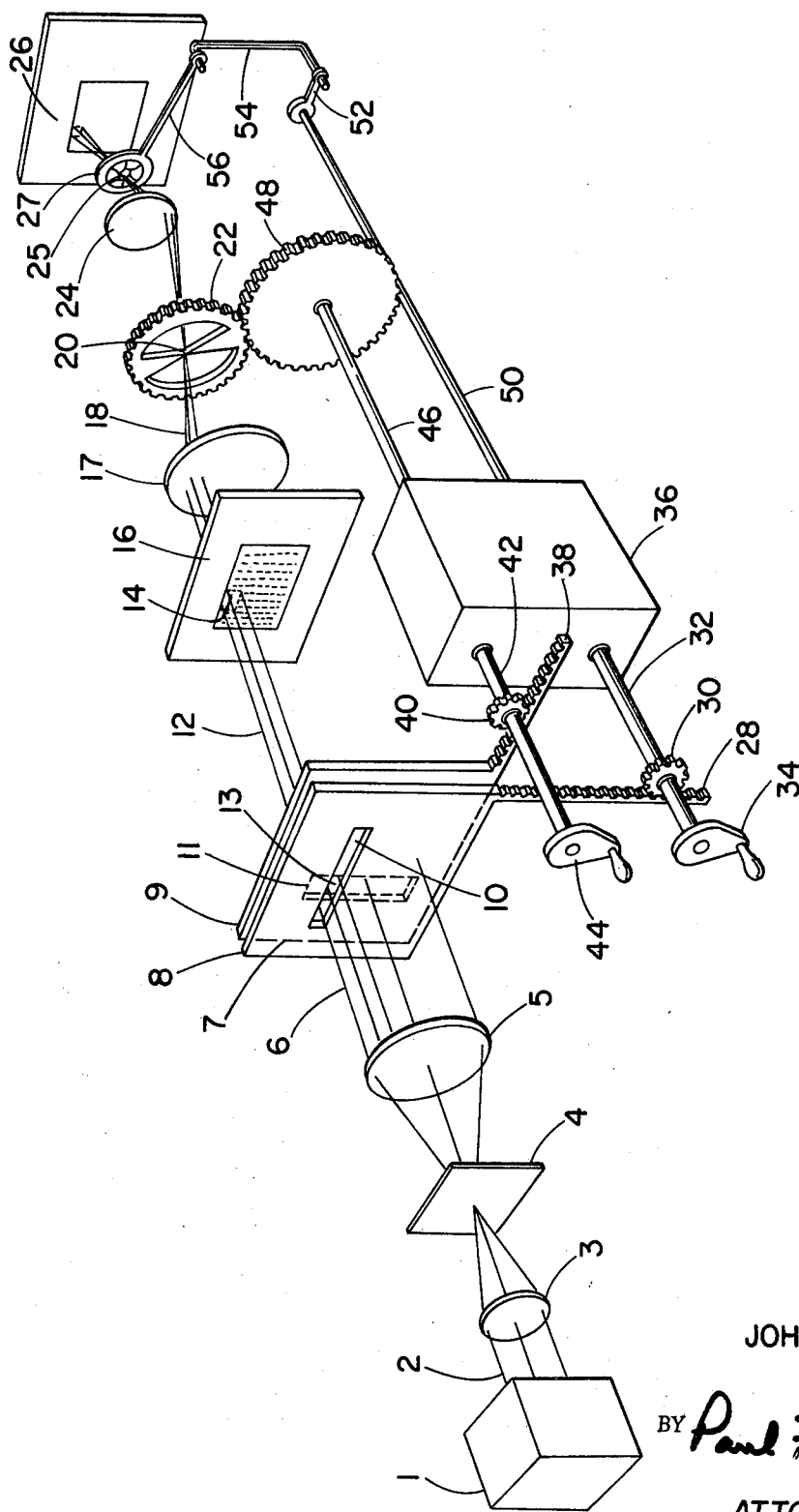
JOHN B. FARR
INVENTOR.
BY *Paul F. Hawley*
ATTORNEY.

United States Patent Office 3,492,635
Patented Jan. 27, 1970

3,492,635
SPATIAL FILTERING SYSTEM WHEREIN DIFFERENT PORTIONS OF AN INPUT OBJECT ARE DIFFERENLY FILTERED
John B. Farr, Tulsa, Okla., assignor to Pan American Petroleum Corporation, Tulsa, Okla., a corporation of Delaware
Filed June 22, 1966, Ser. No. 559,461
Int. Cl. G01v 1/00; G02b 5/18
U.S. Cl. 340—15.5          4 Claims

ABSTRACT OF THE DISCLOSURE

This invention involves methods and apparatus for the optical processing of two-dimensional data displayed in the form of a variable density transparency. A part of this transparency is illuminated with coherent light, for example as from a laser, and the transmitted light as modulated by the illuminated part of the transparency is formed into a Fourier transform and optically attenuated to filter undesirable data features, then the light is reconstructed optically to form a first segment of an output image. A second part of the transparency differing from the first part is then illuminated and the steps repeated, to form a second segment of the same output image. However, in this second case, the optical attenuation in the Fourier plane is different from that in the first case, so that the resultant image involves different optical processing or filtering of various parts of the transparency being processed.

---

This process is extended to the systematic scanning by laser light of one after another parts of a transparency until all sections have been illuminated, the optical attenuation at the Fourier plane systematically changing as the illuminated area of the transparency changes, to produce an output image in which there has been a systematic variation in the filtering throughout the entire image.

This system has found particular application in aiding interpretation of seismic data with enhanced filtering operations and thus using optimized filters for each particular area of the input section or transparency. This produces a mosaic output image which is photographed for premanent recording purposes.

Data concerning the depth and attitude of subsurface strata obtained by the seismic method consists of a multiplicity of time varying electrical signals; each represents vibratory motion at a specific location on the earth's surface. Such vibrations result from the arrival of that particular point of wave motion initiated by a man-made disturbance at or near the surface. A dynamite explosion may be used for this purpose. Other means of seismic initiation are also well known. The resulting train of wave motion detected, modified by filters, and recorded reveals that time for a seismic wave to travel downward into the earth and to be reflected in part at each acoustic interface. These electrical signals, usually with a duration of about one to five seconds are displayed in any of several ways to permit study of the relationhip between signals from the many subsurface beds encountered by the seismic wave.

One of the most useful display techniques is that known as the variable density cross section. In one way to prepare such a cross section, the electrical signals representing earth motion are converted into light beams which are intensity modulated by the electric signals. The resulting multiplicity of tracks or traces as they are commonly called in photograhically recorded adjacent each other against time to display the relationship of seismic signals from corresponding adjacent points on the earth's surface.

Contiguous traces usually show a marked similarity since they are the analog of reflected seismic waves produced by wave motion from the dynamite shock as it impinges on substantially continuous rock, sand or shale strata.

When such a cross section is oriented with the near-surface beds at the top of the chart and successively deeper beds extending toward the bottom of the chart, the general image produced is similar in appearance to a vertical slice taken through the earth along the line from which the seismic signals were derived.

In areas where the acoustic paths of the waves downward through the earth and back to the surface are essentially undistorted by deleterious geological features, the resulting cross section is relatively free from spurious events; where this is not the case, that data may defy analysis and interpretation by the most skillful interpreter.

As the search for petroleum continues, an increasing number of areas are being seismically mapped where interpretation of the data obtained presents problems of increasing complexity. The expanding need for petroleum continues to provide the impetus to develop improved methods and apparatus for use by the industry. My present invention is such a development; the advantages will become apparent as the details are set forth.

One of the newer data enhancement procedures is based on optical techniques. This method which may treat the entire cross section as a whole has a number of advantages. Aside from a several fold speed ratio with respect to other data processing methods, the optical method possesses great analytical power which results from considering the relationship of associated subsurface features. Other seismic data processing methods operate on the input information a trace at a time with no adaptive adjustment to the features of near-by traces.

The operating principles and optical configuration of the apparatus conventionally used for data processing by optical means is described by M. B. Dobrin, A. L. Ingalls, and J. A. Long; Geophysics, vol. 30, No. 6, December, 1965, pp. 1148–1178. My invention uses methods and equipment as described in the above reference. However, the advantages afforded by my invention result from a modification of the usual apparatus and operating techniques to provide greater flexibility and improved definition in the processing data.

The usual method of optically processing a seismic cross section involves illuminating a film transparency of the cross section with coherent light, forming a Fourier transform. In the transform selected portions are masked and subsequently the remaining parts of the beam from an image similar in form to the input transparency.

Previous mentioned was the fact that the ability of the optical processing method to consider the entire input cross section and to deal with all angles of orientation and all frequencies without respect to the location on the cross section from which they originate is frequently an advantage. My invention, however, provides a technique by which the seismic information may be optically processed to achieve improved resolution and by which the source area on the cross section may be selected to permit analysis of the similar areas without there being "diluted" by data from the entire section appearing in the transform plane at the same time. This technique provides the chief advantage of my invention in that it provides the operator with a means of applying the optimum filter characteristic to each segment of the input data chart. The essential difference between the mode of operation taught by my invention and that conventionally used with the method of optical data processing lies in the fact that I provide a mask on the input transparency to permit the coherent light beam to pass through only a portion of the entire cross section at one time. Optimum filtering may then be achieved by filters appropriate to this particular portion of the cross section. This is done by suitably masking portions of the Fourier transform pattern and reconstructing an image with each segment of the input cross section occupying a corresponding position on the output cross section. The advantage of such a system is immediately apparent when one considers in a particularly seismic cross section it is often desirable to process, for instance, only the deeper strata or alternatively the shallower strata each without the influence of the other. As an example of this we may consider the case where data from an intermediate depth may show "beds" dipping in a particular direction but which are in effect spurious and should be removed from the output section. In this same input section there may be beds at greater depth which lie at the same angle as those of the intermediate depth, which the interpreter wishes to maintain in the processed cross section. My invention provides a means of removing the selected dips in the beds of intermediate depth without moving beds with an identical dip which occur elsewhere on the cross section. In this case, this may be readily accomplished by masking all of the input cross section except the region of intermediate depth. The transform generated by this information may be stripped of the false data by suitable masks placed in the transform plane and photographed at the position of the output image. While the photographic plate in the output image plane is still in place, all of the input section except that corresponding to the beds of greater depth may be masked and the transform of this information allowed to pass unobstructed, to be photographed in its corresponding position as a portion of the total output image. Of course, what was illustrated above with respect to beds dipping at identical angles also applies to the elimination or the enhancement of selected wave frequencies from chosen portions of the input cross section.

As a practical matter, it is often desirable to employ a mask system at the input cross section transparency which divides the total area of the cross section into segments of regular geometric form. These may then be individually processed employing filtering techniques most appropriate to the circumstances of each segment and with all segments ultimately photographed in their relative positions on the output section.

It is therefore an object of my invention to provide a method and apparatus by which each section of an input data display may be processed individually by using the optimum enhancement arrangement and later reassembled into the form of the input information. It is also an object of my invention to teach a method by which selected portions of an input cross section may be prevented from making a contribution to the Fourier transform and ultimately the reconstructed image. It is a further object of my invention to provide a method and apparatus by which selected portions of an input data display may be favored over other areas of the same input data display to the extent that they make greater their proportional contribution to the output data display.

In addition to the method as outlined above in which optimum filtering may be applied to each section of the input data, my invention also permits the use of time-varying filtering. This is accomplished by permitting to pass into the transform plane only that part of the input cross section exposed by a moving slit mask, and varying the position of the mask in the transform in a predetermined manner. If such a mask is moved across the input data in a predictable manner, say, from lesser to greater reflection times, the band pass characteristics of the system may be made to vary in an appropriate manner with respect to seismic time. As an example, where it is desired to filter the cross section with an arrangement which passes relatively high frequencies during the early part of the record and low frequencies during the latter, a moving filter may be used in the transform plane. Motion of the filter at the input section may be related to movement of the frequency filter in the transform plane in either a linear or a non-linear manner. The above remarks pertaining to time-varying frequency filters are also applicable to dip rejection or dip acceptance filters. Such an arrangement is especially useful where it is desired to remove reverberations or secondary reflections whose dip angle varies as a function of record time.

It is therefore another object of my invention to provide a method and apparatus by which time-varying filtering may be accomplished directly on the record cross section. While for the sake of clarity and simplicity, discussion of the foregoing filtering concepts has dealt only with the use of light-blocking filters, other types of filtering devices may be used effectively in the Fourier transform. For instance, where it is desired to reduce a particular feature, but not entirely eliminate it, filters having light-attenuating characteristics lying between the limits of complete transparency and total opacity may be used to produce relative attentuations between selected features which are distinguishable in the transform pattern.

The separation of a light beam by diffraction into its frequency and areal position components is analogous to the generation to the side bands of a modulated electric wave, and, as in the case of a modulated electric wave, the modulation products resulting from diffraction of a current light beam may be described in terms of amplitude and phase. Heretofore, in the description of my invention I have dealt only with the amplitude terms of the modulation, i.e., the intensity of the diffracted portion of the light beam as it occurs in the Fourier transform plane. Filtering has been accomplished by attenuating to a selected degree the intensity of selected portions of the transform pattern. Again, as in the case of the electric wave theory, where selected portions of the side bands may be modified by altering their phase angle with respect to the phase of the carrier, a similar effect may be achieved optically by my invention when phase retarding plates are imposed in selected portions of the transform plane. By the use of this technique, I am able to enhance or degrade portions of the final image by the use of constructive or destructive interference between portions of the image.

It is, therefore, another objective of my invention to disclose a method of filtering input data by the use of attenuating filters to achieve less than total elimination of selected features.

Still another objects of my invention is to accomplish complex filtering by the modification of the phase angle of selected portions of the Fourier transform with respect to other areas of the transform pattern. The manner in which this and other objectives are accomplished will be understood by referring to the following description and drawing.

FIGURE 1 is an illustration of an optical data processing schemes to which has been added the features of my invention. Specifically, the operation of this apparatus is as follows:

A coherent light source 1 emits light in the form of a beam 2. Lens means 3 focuses beam 2 to a point where it passes through pinhole 4. The emerging divergent beam is then collimated by lens means 5 to form parallel beam 6. Across this parallel beam I introduce mask assembly 7. This assembly consists essentially of at least two movable, opaque plates 8 and 9, which contain openings 10 and 11, respectively. In cooperation, openings 10 and 11 define aperture 13 which is movable in response to the horizontal and vertical positions of plates 8 and 9, respectively.

Openings 10 and 11 are illustrated as essentially rectangular slots, the intersection of which defines aperture 13. However, such opening need not be restricted to symmetrical geometric figures. Openings of any size or shape to accommodate the problem at hand may be used. Fo rinstance, if opening 11 is shaped in the form of a triangle with apex at the top, the resulting aperture will not remain of constant size but will increase in horizontal dimension, and hence in area as the aperture 13 is positioned lower in light beam.

In some cases it may be desirable to substitute for mask assembly 8 a rotating aperture defining device such as the Nipkow disc image dissector, not shown. This mask means consisting of a number of holes arranged in a helical pattern in a rotating disc may be employed to position an aperture as required to illuminate a selected portion of an object. Such a device is especially advantageous when it is necessary to scan an object at relatively high speed.

Beyond mask assembly 7 the resultant beam 12, having been reduced in cross section area by aperture 13 now impinges upon a selected area 14 of data input transparency 16. Having passed through area 14, the issuing beam 18 is now spatial modulated by the information of area 14 and by the action of lens 17 forms a Fourier transform at point 20. The characteristic of the Fourier transform is such that the elements which constitute the spatial modulation of beam 18 become separated from the central portion of beam 18 and are positioned around it in accordance with the frequency and angular orientation of the data elements comprising the portion 14 of transparency 16.

We may now avail ourselves of the opportunity to remove from the input data any feature which is distinguishable in the Fourier pattern. One method of accomplishing this is by inserting a system of opaque masks into the transform plane and thereby blocking the features which are to be eliminated from the processed data. Filter mask 22 is typical of such devices and may be adjusted by rotating it about the optical axis to obstruct the passage of all events of the data which have angular orientations appropriate to the wedge angle of this filter. In a similar manner, an obstructing filter may be introduced at this or other transform planes to eliminate features having selected frequency content. An example of such frequency filtering is shown in a second transform plane 25, formed by second objective (positive) lens 24 where iris 27 is positioned, and its aperture adjusted to obstruct all frequencies above a selected band. Beyond transform 25 the light beam diverges to form an image on the output target 26, which correspond in areal location to the segment 16 from which the data was initially derived.

Continuing this process toward the completion of the entire image on target 26, aperture 13 may be systematically adjusted in both vertical and horizontal directions. If the aperture 13 is positioned in a systematic manner to successively illuminate selected areas of input transparency 16 as a function of seismic reflection time, a time-varying filter operation may be performed. One way in which this may be done is by moving aperture 13 in a vertical manner by gear rack 28 cooperating with gear 30. Rotation of shaft 32 by crank 34 moves plate 7 and, at the same time, provides a rotational input to mechanical function generator 36. What has been said regarding vertical motion applies equally to horizontal motion provided by gear rack 38, gear 40, shaft 42 and crank 44. By incorporating suitable components, such as cams, gears and levers, mechanical function generator 36 provides rotary motion to shaft 46 and gear 48 which, in turn, adjusts the angular position of filter 22 in accordance with a previously selected plan. When frequency filtering is to be performed in accordance with a predetermined function of record time, record segment or other significant parameter, output shaft 50 from mechanical function generator 36 may be operably coupled through crank 52, link 54, and adjustment arm 56 to control the opening and hence the frequency pass band of iris 27.

Having now described and illustrated the preferred embodiment of my invention, I acknowledge that there are numerous other manners in which the principle of my invention may be implemented by one skilled in the art. It is therefore my invention to include all such embodiments which lies within the scope of the following claims.

I claim:
1. An apparatus for the optical enhancement of spatially displayed data comprising the following elements:
   a spatial display of input data in the form of a variable density transparency,
   a source of coherent light,
   optical means for producing an substantially collimated beam of said coherent light of width at least coextensive with the width of said transparency and directed at said display,
   means including a movable mask (1) within said beam to illuminate only a selected part of said transparency at a time,
   optical means to form a Fourier transform from the illuminated part of said transparency in a plane transverse the path of said coherent light,
   movable masking means (2) positioned at said Fourier transform to act as a spatial filter,
   coupling means connected between said movable mask (1) and said movable masking means (2) for changing the position of said movable masking means (2) in response to both position of said movable mask (1) and at least one other selected parameter, and
   second objective lens means in the path of said coherent light beyond the plane of said Fourier transform for reconstructing an image of the illuminated part of said transparency as modified by the movable masking means (2), whereby different portions of said transparency are differently filtered.

2. The apparatus of claim 1 in which said input display is a seismic record section and in which the selected parameter corresponds to a preselected interval of time on said section.

3. A method of optically processing areally displayed data comprising the following steps:
   positioning an input data display in the form of a variable density transparency in a beam of substantially collimated, coherent light in a form to spatially modulate said light beam, the width of said beam being at least coextensive with the width of said transparency,
   systematically and progressively obstructing part of said light beam adjacent said transparency over substantially the whole area of said transparency whereby the resulting light beam is spatially modulated in accordance with only a preselected portion of said transparency at any one time,
   optically forming a Fourier transform of said resulting light beam,
   optically attenuating undesirable data features at said Fourier transform variably and in accordance with the location of said preselected portion, and
   reconstructing the modulated and optically attenuated light beam to form an output image of said transparency, whereby different parts of said output image have been differently optically filtered to remove undesirable data features with respect to the position of such features within said transparency.

4. A method in accordance with claim 3 including the step of maintaining the size of said preselected portion of said transparency substantially constant.

(References on following page)

References Cited

UNITED STATES PATENTS

| | | | |
|---|---|---|---|
| 3,240,108 | 3/1966 | Lehan et al. | 350—162 |
| 3,321,739 | 5/1967 | Lee | 340—15.5 |
| 3,370,268 | 2/1968 | Dobrin et al. | 340—15.5 |

OTHER REFERENCES

Jackson: Geophysics, vol. XXX, No. 1, February 1965, pp. 5-23 (pp. 5-10 and 15-18 relied upon).

DAVID SCHONBERG, Primary Examiner

R. J. STERN, Assistant Examiner

U.S. Cl. X.R.

350—162